United States Patent
Ogawa

(10) Patent No.: US 12,556,670 B2
(45) Date of Patent: Feb. 17, 2026

(54) VIDEO PROJECTION DEVICE

(71) Applicant: SONY GROUP CORPORATION, Tokyo (JP)

(72) Inventor: Yusuke Ogawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 775 days.

(21) Appl. No.: 17/790,571

(22) PCT Filed: Nov. 18, 2020

(86) PCT No.: PCT/JP2020/042967
§ 371 (c)(1),
(2) Date: Jul. 1, 2022

(87) PCT Pub. No.: WO2021/140752
PCT Pub. Date: Jul. 15, 2021

(65) Prior Publication Data
US 2023/0060689 A1   Mar. 2, 2023

(30) Foreign Application Priority Data

Jan. 10, 2020 (JP) ................................ 2020-003048

(51) Int. Cl.
| | |
|---|---|
| H04N 9/31 | (2006.01) |
| G02B 27/01 | (2006.01) |
| H01S 5/40 | (2006.01) |

(52) U.S. Cl.
CPC ....... H04N 9/3164 (2013.01); G02B 27/0172 (2013.01); H04N 9/3129 (2013.01);
(Continued)

(58) Field of Classification Search
None
See application file for complete search history.

(56) References Cited

U.S. PATENT DOCUMENTS

| | | | |
|---|---|---|---|
| 5,325,386 A | 6/1994 | Jewell et al. | |
| 11,122,256 B1 * | 9/2021 | Topliss | G02B 27/0172 |

(Continued)

FOREIGN PATENT DOCUMENTS

| | | |
|---|---|---|
| JP | H07-506220 | 7/1995 |
| JP | H11505627 A | 5/1999 |

(Continued)

OTHER PUBLICATIONS

International Search Report and Written Opinion prepared by the Japan Patent Office on Dec. 21, 2020, for International Application No. PCT/JP2020/042967, 3 pgs.

Primary Examiner — Bao-Luan Q Le
Assistant Examiner — Danell L Owens
(74) Attorney, Agent, or Firm — Sheridan Ross PC

(57) ABSTRACT

The purpose of the present technology is to provide a video projection device capable of obtaining a satisfactory video (image) while achieving reduction in power consumption and reduction in size of the device. Provided is a video projection device including at least: a monolithic semiconductor laser array including multiple light emitting units, each of which emits a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina. The multiple light emitting units are respectively optically coupled to different input ports among multiple input ports included in the optical waveguide.

16 Claims, 13 Drawing Sheets

(52) U.S. Cl.
CPC ......... *H04N 9/3144* (2013.01); *H04N 9/3161* (2013.01); *H04N 9/317* (2013.01); *H01S 5/4025* (2013.01)

(56) References Cited

U.S. PATENT DOCUMENTS

| | | | |
|---|---|---|---|
| 2003/0030919 A1* | 2/2003 | Pezeshki | G02B 26/0841 |
| | | | 359/726 |
| 2016/0156885 A1* | 6/2016 | Horikawa | H04N 9/3129 |
| | | | 348/751 |
| 2016/0274362 A1* | 9/2016 | Tinch | G02B 27/0172 |
| 2017/0200422 A1* | 7/2017 | Okamoto | G09G 3/02 |
| 2017/0295229 A1 | 10/2017 | Shams et al. | |
| 2019/0121136 A1* | 4/2019 | Pierer | H01S 5/4093 |
| 2020/0033590 A1 | 1/2020 | Katsuyama et al. | |
| 2020/0090569 A1* | 3/2020 | Hajati | G09G 3/02 |

FOREIGN PATENT DOCUMENTS

| | | | |
|---|---|---|---|
| JP | 2002341166 A | * | 11/2002 |
| JP | 2004-145367 | | 5/2004 |
| JP | 2004235190 A | | 8/2004 |
| JP | 2008-010837 | | 1/2008 |
| JP | 2009-177058 | | 8/2009 |
| JP | 2009-212479 | | 9/2009 |
| JP | 2015179245 A | | 10/2015 |
| JP | 2017-125905 | | 7/2017 |
| WO | WO 2017/057243 | | 4/2017 |
| WO | WO 2018/186046 | | 10/2018 |

\* cited by examiner (a)

(b)

(a)

(b)

(a)

(b)

(a)

(b)

(a)

(b)

VIDEO PROJECTION DEVICE

CROSS REFERENCE TO RELATED APPLICATIONS

This application is a national stage application under 35 U.S.C. 371 and claims the benefit of PCT Application No. PCT/JP2020/042967, having an international filing date of 18 Nov. 2020, which designated the United States, which PCT application claimed the benefit of Japanese Patent Application No. 2020-003048, filed 10 Jan. 2020, the entire disclosures of each of which are incorporated herein by reference.

TECHNICAL FIELD

The present technology relates to a video projection device.

BACKGROUND ART

In recent years, attention has been focused on, for example, a technique of superimposing and displaying a video on an external scene such as a real landscape. This technology is also called augmented reality (AR) technology. Examples of products using this technology include a head mounted display. The head mounted display is used by being worn on the head of a user. In a video (image) display method using a head mounted display, for example, light from the head mounted display as well as light from the outside world reach eyes of the user, so that a video (image) is displayed in a superimposed manner on an image of the outside world.

For example, Patent Document 1 proposes a technology related to an image display device such as a head mounted display provided with a light modulation unit, in which a plurality of laser light beams is independently modulated, emitted, and projected, and color deviation is reduced.

CITATION LIST

Patent Document

Patent Document 1: Japanese Patent Application Laid-Open No. 2017-125905

SUMMARY OF THE INVENTION

Problems to be Solved by the Invention

However, in the technology proposed in Patent Document 1, color deviation of an image can be reduced due to the light modulation unit being provided, whereas the light modulation unit is provided separately from a light source, so that there is a possibility that reduction in power consumption and reduction in size of the device cannot be achieved.

In view of this, the present technology has been accomplished in light of such a circumstance, and a main object thereof is to provide a video projection device capable of obtaining a satisfactory video (image) while achieving reduction in power consumption and reduction in size of the device.

Solutions to Problems

As a result of intensive research to address the above-described object, the present inventors have surprisingly succeeded in being able to obtain a satisfactory video (image) while achieving reduction in power consumption and reduction in size of a device, and have completed the present technology.

That is, as a first aspect of the present technology, a video projection device is provided that includes at least: a monolithic semiconductor laser array including multiple light emitting units, each of which emits a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which the multiple light emitting units are respectively optically coupled to different input ports among multiple input ports included in the optical waveguide.

In the video projection device according to the first aspect of the present technology, the laser light beams respectively emitted from the multiple light emitting units included in the monolithic semiconductor laser array may have substantially same wavelengths.

In addition, as a second aspect of the present technology, a video projection device is provided that includes at least:
multiple monolithic semiconductor laser arrays, each of which includes one or more light emitting units that emit a laser light beam;
an optical waveguide that guides the laser light beam in a predetermined direction;
a mirror that scans the laser light beam in two axes; and
a diffractive element that diffracts the laser light beam in a specific direction in front of an eye and projects the laser light beam on a retina,
in which the laser light beams respectively emitted from the one or more light emitting units of the multiple monolithic semiconductor laser arrays differ in wavelength, and
the one or more light emitting units of the multiple monolithic semiconductor laser arrays are respectively optically coupled to different input ports among multiple input ports included in the optical waveguide.

In the video projection device according to the second aspect of the present technology, the laser light beams that differ in the wavelength may be multiplexed in the optical waveguide.

In addition, as a third aspect of the present technology, a video projection device is provided that includes at least:
multiple monolithic semiconductor laser arrays, each of which includes at least one light emitting unit that emits a laser light beam;
an optical waveguide that guides the laser light beam in a predetermined direction;
a mirror that scans the laser light beam in two axes; and
a diffractive element that diffracts the laser light beam in a specific direction in front of an eye and projects the laser light beam on a retina,
in which at least one monolithic semiconductor laser array among the multiple monolithic semiconductor laser arrays includes multiple light emitting units,
the laser light beams respectively emitted from the multiple light emitting units included in the at least one monolithic semiconductor laser array differ in wavelength, and
the multiple light emitting units of the at least one monolithic semiconductor laser array are respectively optically coupled to different input ports among a plurality of input ports included in the optical waveguide.

In the video projection device according to the third aspect of the present technology, the laser light beams that differ in the wavelength may be multiplexed in the optical waveguide.

In the video projection device according to any one of the first to third aspects of the present technology,
the monolithic semiconductor laser array and the optical waveguide may be joined via a joint member, and
the joint member may have heat radiation performance and have a linear expansion coefficient close to a linear expansion coefficient of the monolithic semiconductor laser array and a linear expansion coefficient of the optical waveguide.

In the video projection device according to any one of the first to third aspects of the present technology,
at least one interval between output ports of multiple output ports included in the optical waveguide may be smaller than at least one interval between input ports of the multiple input ports included in the optical waveguide.

In the video projection device according to any one of the first to third aspects of the present technology,
the optical waveguide may have at least three output ports, and
intervals between output ports of the at least three output ports may be substantially equal to each other.

In the video projection device according to any one of the first to third aspects of the present technology,
when a number of multiple output ports of the optical waveguide is N,
an angle at which the laser light beam reflected by the mirror moves in a direction substantially orthogonal to a resonance operation direction of the mirror while reciprocating halfway in the resonance operation direction is α°,
a focal length of a lens that substantially collimates the laser light beam emitted from each of the N output ports is f, and
a distance between a center of a predetermined output port among the N output ports to a center of an output port adjacent to the predetermined output port is d,
the video projection device may satisfy following Formula (1).

[Expression 1]
$$d = f \tan[\alpha(m+1/N)] \quad (1)$$

(where m is an integer of 0 or more)

In the video projection device according to any one of the first to third aspects of the present technology,
when a number of multiple output ports of the optical waveguide is N,
an angle at which the laser light beam reflected by the mirror moves in a direction substantially orthogonal to a resonance operation direction of the mirror while reciprocating halfway in the resonance operation direction is α°,
a focal length of a lens that substantially collimates the laser light beam emitted from each of the N output ports is f, and
a distance between a center of a predetermined output port among the N output ports to a center of an output port adjacent to the predetermined output port is d,
the video projection device may satisfy following Formula (2).

[Expression 2]
$$d = f \tan[\alpha(m+1)] \quad (2)$$

(where m is an integer of 0 or more)

In the video projection device according to any one of the first to third aspects of the present technology,
the monolithic semiconductor laser array may be of an edge-emitting type.

In the video projection device according to any one of the first to third aspects of the present technology,
the monolithic semiconductor laser array may be of a surface-emitting type.

The video projection device according to any one of the first to third aspects of the present technology may be a head mounted display.

The video projection device according to any one of the first to third aspects of the present technology may be an eyewear display.

According to the present technology, it is possible to provide a video projection device capable of obtaining a satisfactory video (image) while achieving reduction in power consumption and reduction in size of the device. Note that the effects described herein are not necessarily limitative, and any of the effects described in the present disclosure may be exhibited.

MODE FOR CARRYING OUT THE INVENTION

Figure 1:
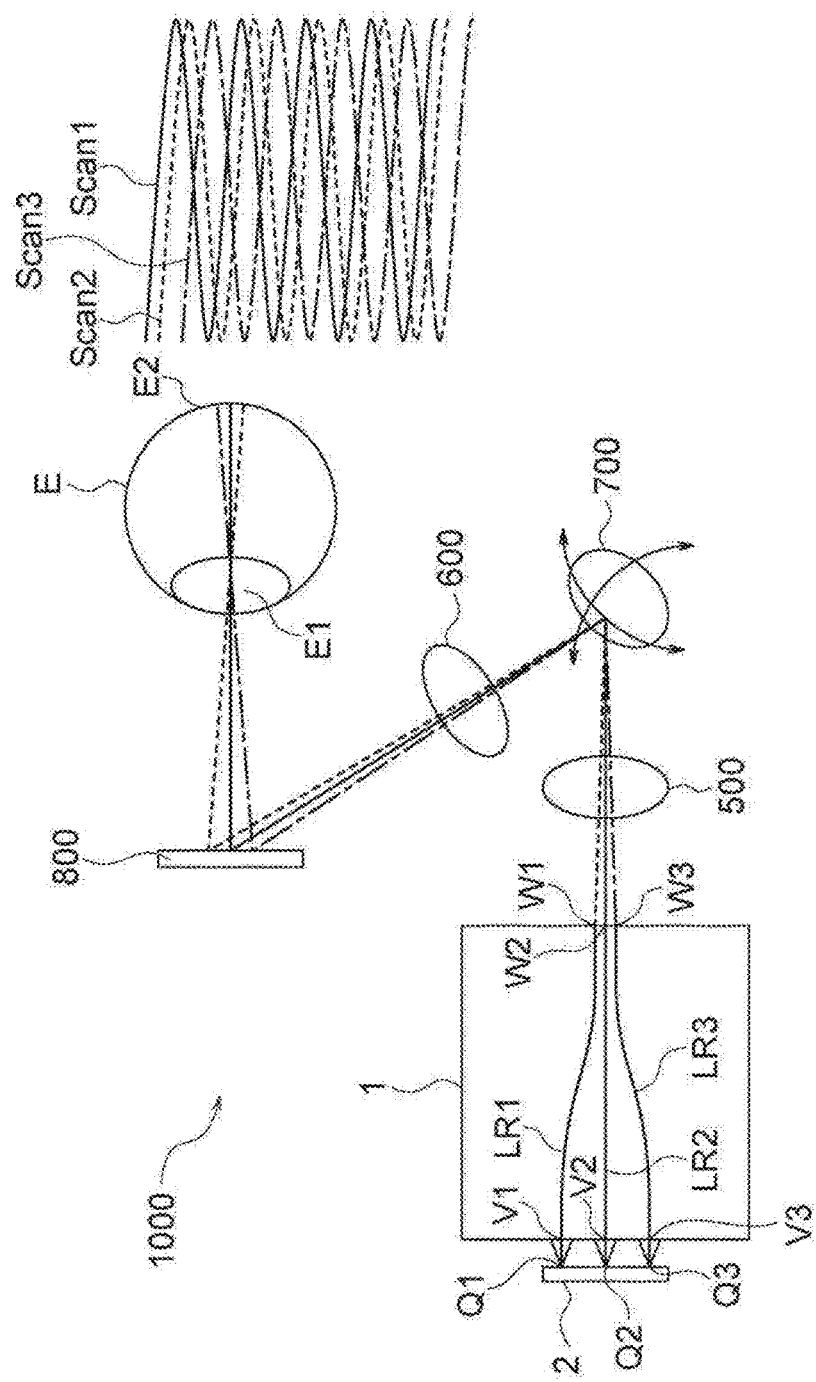
FIG. 1 is a diagram illustrating a configuration example of a video projection device according to a first embodiment to which the present technology is applied.

Preferred modes for carrying out the present technology will be described below. The embodiments described below show an example of a representative embodiment of the present technology, and the scope of the present technology is not narrowly construed by the embodiments. Note that, in the drawings, the wording "upper" means an upward direction or an upper side in the drawings, the wording "lower" means a downward direction or a lower side in the drawings, the wording "left" means a left direction or a left side in the drawings, and the wording "right" means a right direction or a right side in the drawings, unless otherwise specified. In addition, in the drawings, the same or equivalent elements or members are denoted by the same reference signs, and redundant description will be omitted.

Note that the description will be given in the following order.
1. Overview of present technology
2. First embodiment (Example 1 of video projection device)
3. Second embodiment (Example 2 of video projection device)
4. Third embodiment (Example 3 of video projection device)
5. Fourth embodiment (Example 4 of video projection device)
6. Fifth embodiment (Example 5 of video projection device)

1. Overview of Present Technology

First, an overview of the present technology will be described. The present technology relates to a video projection device.

Figure 18:
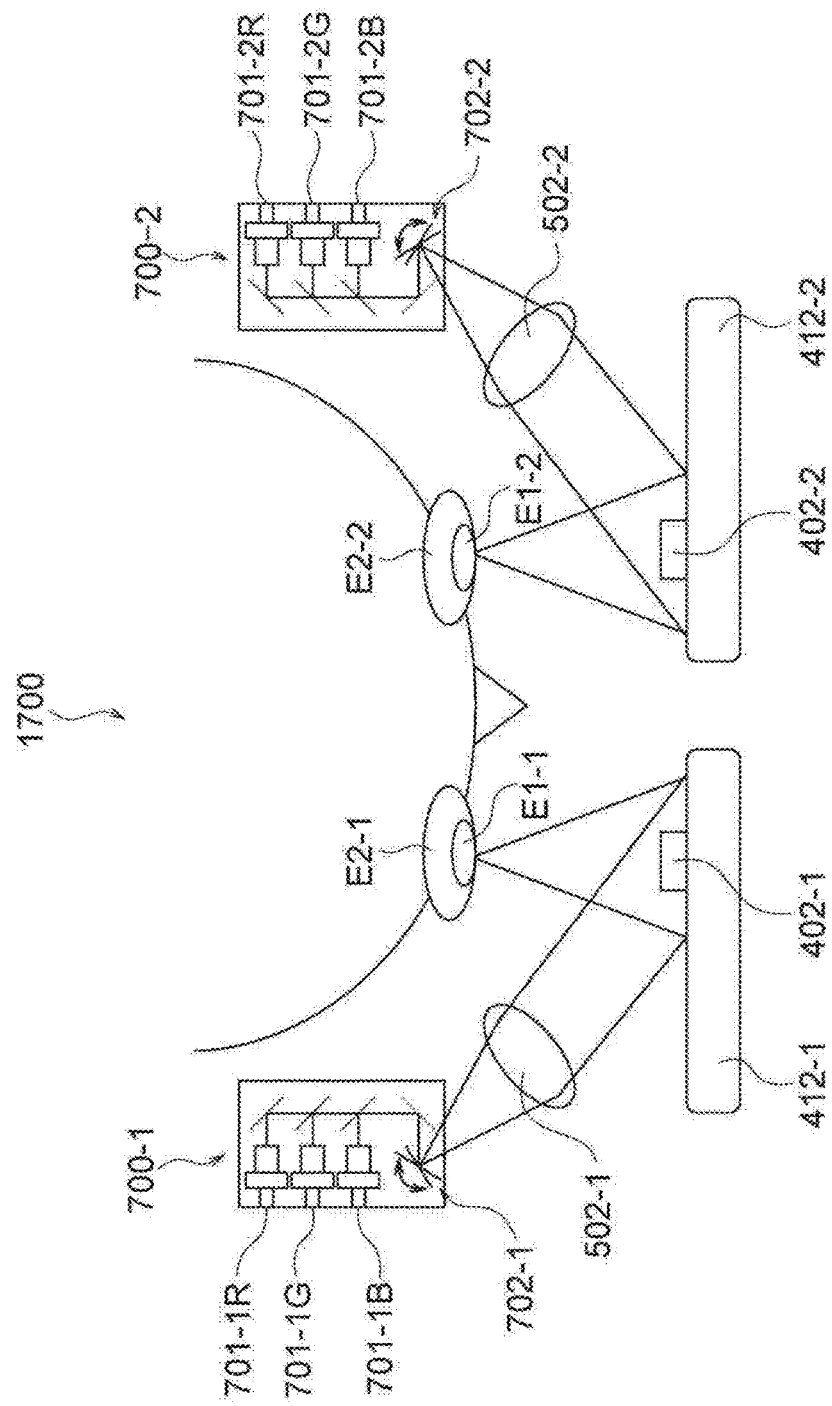
FIG. 18 is a diagram illustrating an example of a configuration of a direct retina eyewear display.

A direct retina eyewear display will be described with reference to FIG. 18. FIG. 18 is a diagram illustrating an example of the configuration of a direct retina eyewear display.

As illustrated in FIG. 18, a direct retina eyewear display 1700 has a basic configuration in which red (R) lasers 701-1R and 701-2R, green (G) lasers 701-1G and 701-2G, and blue (B) lasers 701-1B and 701-2B are multiplexed via a mirror or the like, collimated by a lens or the like, scanned in a two-dimensional direction by mirrors 702-1 and 702-2 (for example, a micro-electrochemical system (MEMS) mirror that scans in two axes, two MEMS mirrors that scan in a single axis, etc.) that scans in two axes, then condensed to pupil vicinities E1-1 and E1-2 through lenses 502-1 and 502-2 and diffractive elements 412-1 and 412-2 (for example, a combiner, etc.), and projected onto retinas E2-1 and E2-2 to obtain an image. On the diffractive element 412-1 (upper side in FIG. 18) and on the diffractive element 412-2 (upper side in FIG. 18), a CAM (camera module) 402-1 (a photodiode (PD) may be used) and a CAM (camera module) 402-2 (a photodiode (PD) may be used) for eye sense are arranged.

The direct retina eyewear display can obtain a high-luminance and focus-free image as compared with a conventional panel type display. Meanwhile, the direct retina eyewear display is required to have an increased angle of view. In order to achieve a high angle of view without lowering the resolution, it is necessary not only to increase the deflection angle of the mirror (for example, MEMS mirror or the like) that scans in two axes, but also to increase the number of scanning lines scanned in one projection. In order to increase the number of scanning lines in a predetermined frame (for example, 60 Hz), it is necessary to increase the resonance frequency of the mirror (for example, MEMS mirror or the like) that scans in two axes. An increase in the deflection angle and an increase in the resonance frequency are contradictory, and it is often difficult to achieve both an increase in the deflection angle and an increase in the resonance frequency by improving performance of a mirror (for example, a MEMS mirror or the like) that scans in two axes.

On the other hand, there is a technique of improving the resolution by preparing a plurality of light sources that can be independently modulated instead of increasing the resonance frequency, scanning a plurality of light beams on a mirror (for example, a MEMS mirror or the like) that scans in the same two axes, and projecting the light beams so as not to overlap each other.

In addition, there is a first different technique of improving resolution by splitting laser light into a plurality of beams on an optical waveguide, independently modulating and emitting the beams, and projecting the beams. This technique includes a light modulation unit provided separately from a light source, and thus, suppresses a temperature change of the light source and reduces a phenomenon in which an optical axis is offset due to a variation in diffraction angle of a diffractive element caused by wavelength variation. However, this technique needs to always maintain the laser light at a maximum output in accordance with the brightest portion of an image, which increases a burden on power consumption. Furthermore, since it is necessary to provide the light modulation unit on the optical waveguide for each split light path, there is a possibility of an increase in size of the device (element).

In addition, as a second different technique, there is a method of converting light into multiple beams by using a plurality of laser beams, particularly, a monolithic semiconductor laser array, in a laser scanning projector. However, in a case where a plurality of light sources is disposed, arranging light emission points with intervals between the light emission points being controlled with high accuracy requires a high mounting technology, and there is a concern that the intervals between the light emission points differ due to a change in environmental temperature or the like. In addition, regarding the method of arranging a plurality of light sources in the monolithic semiconductor laser array, the light emission points can be arranged with intervals between the light emission points being controlled with high accuracy, whereas misalignment at a projection position on the image increases because the interval between the light emission points is about 100 μm from the viewpoint of the structure of the semiconductor laser and the viewpoint of heat radiation performance. Therefore, when a portion where projected light beams from the light emission points overlap each other is cut out from the image, the effective region of the image may be decreased.

The present technology has been accomplished in view of the above circumstances. According to the present technology, it is possible to provide a video projection device capable of obtaining a satisfactory video (image) while achieving reduction in power consumption and reduction in size of the device.

More specifically, according to the present technology, a plurality of laser light beams is formed so as not to overlap each other on a screen (on a retina), by which the number of scanning lines in the screen can be increased, and thus, an angle of view can be increased without lowering the resolution. Furthermore, according to the present technology, a high-resolution video can be obtained as long as the angle of view is constant. Furthermore, according to the present technology, in a case where the luminance of the screen is limited by a laser output, the brightness of the screen can be increased by forming a plurality of laser light beams on the screen so as to overlap each other. Meanwhile, the present technology can be applied to a head mounted display, an eyewear display, a projector, and the like.

A monolithic semiconductor array and an optical waveguide are provided with the interval between light emission points (the interval between light emitting units) of the monolithic semiconductor laser array and the interval between input ports of the optical waveguide being controlled with high accuracy (for example, at equal intervals) by semiconductor lithography, and are connected (joined) directly (via air) or via a material having high heat radiation performance and a linear expansion coefficient close to (or substantially equal to) that of the monolithic semiconductor laser array or the optical waveguide or those of both of the monolithic semiconductor laser array and the optical waveguide. Thus, high light coupling efficiency is achieved, and a structure robust against a change in environmental temperature is obtained.

A decrease in an angle of view can be minimized by decreasing the interval between laser light beams by the optical waveguide. Output ports of the optical waveguide are also provided with the interval therebetween being controlled with high accuracy. Therefore, it is easy to form an image with the light beams being not overlapped with each other during projection, and the relationship regarding the interval between the output ports is maintained with respect to a change in environmental temperature.

In a case where a plurality of beams of light is projected on the retina by a diffractive element, the diffraction angle may differ depending on the wavelength. On the other hand, in the configuration using the monolithic semiconductor laser array, the array is formed on the same substrate by the same process, and thus, it is possible to achieve a single wavelength and to set the diffraction angle to be constant. In addition, downsizing can be achieved by multiplexing a plurality of light beams (for example, red light (R light), green light (G light), blue light (B light), and the like) on the optical waveguide.

Embodiments according to the present technology will be described in detail below.

2. First Embodiment (Example 1 of Video Projection Device)

A video projection device according to a first embodiment (Example 1 of the video projection device) of the present technology includes at least: a monolithic semiconductor laser array including multiple light emitting units, each of which emits a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which the multiple light emitting units are respectively optically coupled to different input ports among multiple input ports included in the optical waveguide.

The optical waveguide is, for example, a planar optical waveguide that guides the laser light beam onto a two-dimensional plane. In the monolithic semiconductor laser array, the multiple light emitting units are formed on the same substrate by semiconductor lithography, for example.

Figure 12:
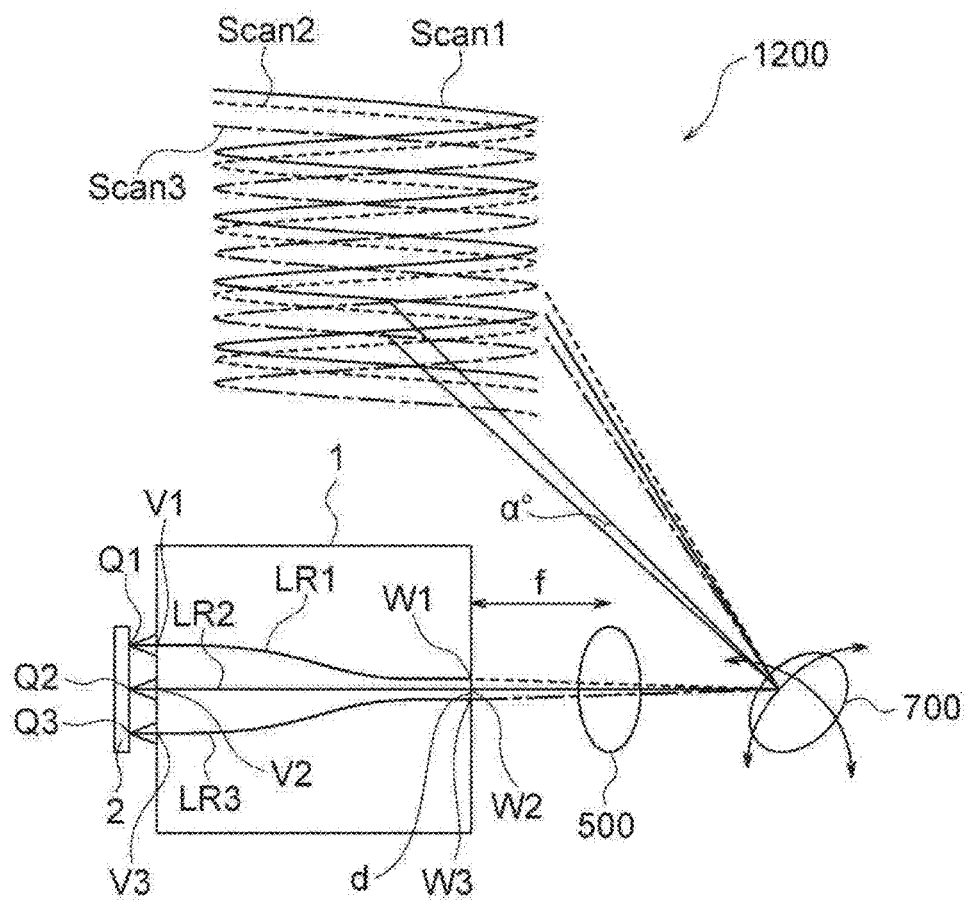
FIG. 12 is a diagram illustrating a configuration example of the video projection device according to the first embodiment to which the present technology is applied.
Figure 17:
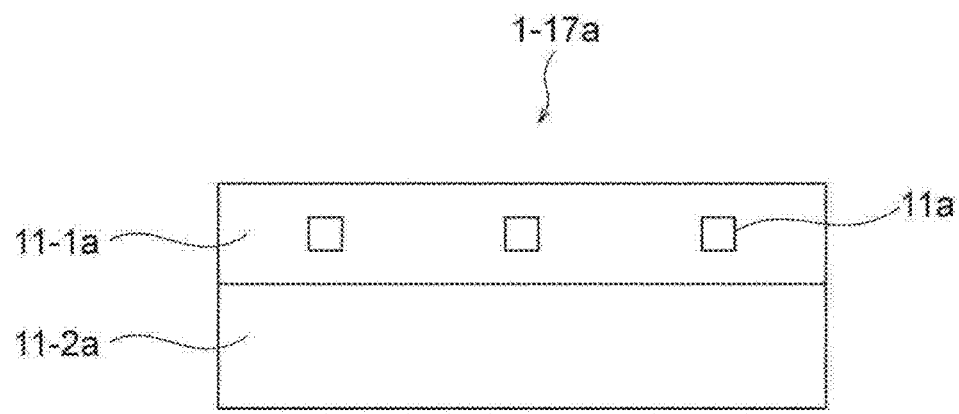
FIG. 17 is a diagram illustrating a configuration example of an optical waveguide included in the video projection device according to the first embodiment to which the present technology is applied.
Figure 17:
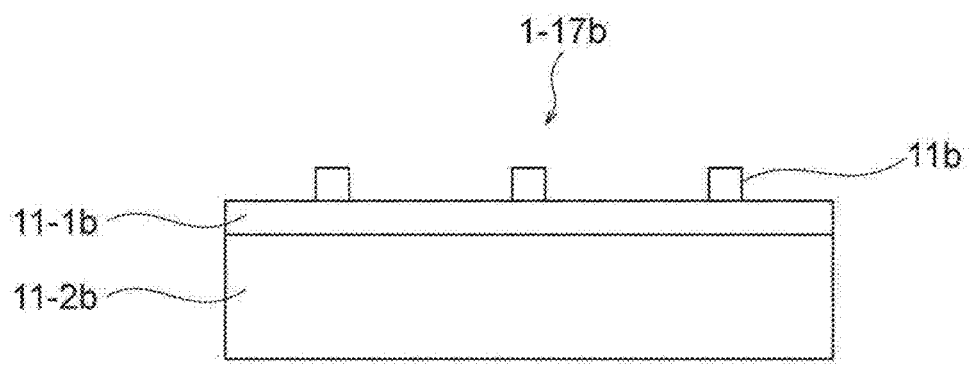

The video projection device according to the first embodiment of the present technology will be described with reference to FIGS. 1, 12, and 17. FIG. 1 is a diagram illustrating a configuration example of the video projection device (video projection device 1000) according to the first embodiment of the present technology. FIG. 12 is a diagram illustrating a configuration example of the video projection device (video projection device 1200) according to the first embodiment of the present technology. Meanwhile, it is obvious that the video projection device according to the first embodiment of the present technology is not limited to the video projection devices 1000 and 1200. FIG. 17 is a cross-sectional view illustrating an optical waveguide 1-17*a* and an optical waveguide 1-17*b* included in the video projection device according to the first embodiment to which the present technology is applied. This cross-sectional view illustrates the optical waveguides cut in a direction substantially perpendicular to the traveling direction of the laser light beam (traveling direction in a case where the laser light beam travels straight from an input port). Note that the optical waveguide 1-17*a* and the optical waveguide 1-17*b* can be applied to video projection devices according to second to fifth embodiments of the present technology described later.

First, description will be given with reference to FIG. 1.

The video projection device 1000 includes: a monolithic semiconductor laser array 2 provided with multiple light emitting units (three light emitting units Q1 to Q3 in FIG. 1)

which are formed on the same substrate by semiconductor lithography and which have substantially the same wavelength (which may be a wavelength band); an optical waveguide 1 (for example, a planar optical waveguide) that guides a laser light beam onto a two-dimensional plane; a mirror 700 (for example, a micro-electro mechanical systems (MEMS) mirror) that scans the laser light beam in two axes; and a diffractive element 800 (for example, a hologram element) that diffracts the laser light beam in a specific direction in front of an eye and projects the laser light beam onto a retina E2.

The monolithic semiconductor laser array 2 and the optical waveguide 1 are bonded to each other directly (via air) or via one material (Si, AlN, etc.) having high heat radiation performance and a linear expansion coefficient close to (or substantially equal to) that of the monolithic semiconductor laser array 2 or the optical waveguide 1 or those of both of the monolithic semiconductor laser array 2 and the optical waveguide 1 (excluding an amount of adhesive), and the light emitting units Q1 to Q3 of the monolithic semiconductor laser array 2 are optically coupled to different input ports V1 to V3 of the optical waveguide, respectively. That is, in FIG. 1, Q1 and V1 are directly optically coupled (via air), Q2 and V2 are directly optically coupled (via air), and Q3 and V3 are directly optically coupled (via air).

The intervals between output ports among the output ports W1 to W3 (in FIG. 1, the interval between the output port W1 and the output port W2 and the interval between the output port W2 and the output port W3) of the optical waveguide 2 coupled to the monolithic semiconductor laser array 2 are narrower than the intervals between the input ports (the interval between V1 and V2 and the interval between V2 and V3). Further, in a case where the number of light emitting units is three or more, the intervals between the output ports are equal. The video projection device 1000 in FIG. 1 has three light emitting units Q1 to Q3, and the intervals between output ports among the output ports W1 to W3 of the optical waveguide 2 are equal (that is, the interval between W1 and W2 and the interval between W2 and W3 have substantially the same length).

Due to the above configuration (the video projection device 1000 in FIG. 1), a plurality of laser light beams is formed so as not to overlap each other on a screen, by which the number of scanning lines in the screen can be increased, and thus, an angle of view can be increased without lowering the resolution. Furthermore, due to the above configuration (the video projection device 1000 in FIG. 1), a high-resolution video can be obtained as long as the angle of view is constant. In a case where the luminance of the screen is limited by the laser output, the above configuration (the video projection device 1000 in FIG. 1) can improve the brightness of the screen by forming a plurality of laser light beams on the screen so as to overlap each other.

The use of the diffractive element 800 (for example, a hologram element) is effective for manufacturing a small eyewear display. However, the diffractive element has large wavelength dispersion. Therefore, a monolithic laser array is used to convert light into multiple beams, by which it is possible to achieve a single wavelength and to diffract a plurality of light beams in the same direction.

On the other hand, in a case where a video is projected only by the monolithic laser array 2, the angle of view is narrowed because the interval between the light emission points is too wide (100 µm or less). Therefore, the interval between the light emission points can be decreased by using the optical waveguide 1 in combination, and a reduction in the angle of view can be avoided. Furthermore, since the optical waveguide 1 and the monolithic laser 2 are formed by semiconductor lithography, it is possible to control a coupling interval for a plurality of light beams, and thus, optical coupling is easily performed.

In addition, as described above, the optical waveguide 1 and the monolithic laser 2 are optically coupled to each other directly (via air) or via one material (Si, AlN, etc.) having high heat radiation performance and a linear expansion coefficient close to (or substantially equal to) that of the monolithic semiconductor laser array 2 or the optical waveguide 1 or those of both of the monolithic semiconductor laser array 2 and the optical waveguide 1 (excluding an amount of adhesive), so that the video projection device 1000 is robust against an environmental change. Furthermore, by multiplexing red laser light, green laser light, and blue laser light by the optical waveguide 1, the device can be downsized, and color deviation due to temperature can be suppressed.

Ideally, the plurality of scanning lines is desirably formed in different scanning optical paths at equal intervals. For example, assuming that the number of output ports is N and the interval between the scanning lines (Scan1 to Scan3) scanned by the MEMS mirror is d1, the angle of each scanning line is desirably set by the following expression with a certain scanning line as a reference.

$$d(m_1+1/N), d(m_2+2/N) \ldots d(m_{n-1}+(N-1)/N)(m_1 \text{ to } m_{n-1} \text{ are integers of 0 or more})$$ [Expression 3]

Here, the interval d1 between the scanning lines is defined as an angle at which the scanning line moves in the vertical direction while reciprocating once in the horizontal direction.

The angle of the scanning line is determined by the interval between the output ports of the optical waveguide and a focal length of a collimator lens provided in the next stage, and when the focal length of the collimator lens is defined as f, the interval between the output ports is desirably set according to the following expression with a certain output port set as a reference.

$$f \tan[d(m_1+1/N)], f \tan[d(m_2+2/N)], \ldots f \tan[d(m_{n-1}+(N-1)/N)]$$ [Expression 4]

For example, when the number of output ports (light emission points) is three (output ports W1 to W3), the interval between scanning lines is 0.06 deg, the focal length of a collimator lens 500 is 5 mm, $m_1=1$, and $m_2=2$, the intervals of the output ports W1 to W3 of the optical waveguide 1 are 6.98 µm and 13.96 µm, respectively, when calculated on the basis of the following formulas with a certain output port (for example, the output port W1) as a reference.

$$5*\tan[0.06*(1+1/3)]=6.98 \text{ µm}$$ [Expression 5]

$$5*\tan[0.06*(2+2/3)]=13.96 \text{ µm}$$ [Expression 6]

When the interval between the output ports (light emission points) is too wide, the effective area of the video is narrowed. When the interval between the output ports (light emission points) is too narrow, transition occurs between cores of the optical waveguide, which adversely affects the video. In view of this, the interval is preferably about several µm.

In a case where there are three or more intervals between the output ports (light emission points), the above formula can be satisfied even if the intervals are not equal. However, in order to satisfy the above formula while minimizing the influence caused by a decrease in the video effective area, it is the best condition that the intervals are equal.

Next, a case where a plurality of laser light beams (light beams) does not overlap each other on the screen (for example, on the retina) and a case where the laser light beams overlap each other will be described with reference to FIG. 12.

The video projection device 1200 illustrated in FIG. 12 includes: a monolithic semiconductor laser array 2 provided with multiple light emitting units (three light emitting units Q1 to Q3 in FIG. 1) which are formed on the same substrate by semiconductor lithography and which have substantially the same wavelength (which may be a wavelength band); an optical waveguide 1 (for example, a planar optical waveguide) that guides a laser light beam onto a two-dimensional plane; and a mirror 700 that scans the laser light beam in two axes. Note that the video projection device 1200 may or may not include a diffractive element. In a case where the video projection device 1200 includes a diffractive element, the video projection device 1200 can diffract the laser light beam in a specific direction in front of the eye by the diffractive element and project the laser light beam on the retina. In this case, the video projection device 1200 can be applied to an eyewear display, a head mounted display, or the like. Alternatively, in a case where the video projection device 1200 does not include a diffractive element, the video projection device 1200 can be applied to a scanning projector capable of projecting a video on a screen.

A case where a plurality of laser light beams (light beams) does not overlap each other on the screen (for example, on the retina) is expressed by following Formula (1).
[Expression 7]

$$d = f\tan[\alpha(m+1/N)] \quad (1)$$

In Formula (1), N is the number of output ports included in the optical waveguide 1, and the number of output ports in FIG. 12 is three (W1 to W3). $\alpha°$ illustrated in FIG. 12 is an angle at which laser light beams LR1 to LR3 reflected by the mirror 700 move in a direction substantially orthogonal to a resonance operation direction (for example, in the horizontal direction) of the mirror 700 while reciprocating halfway in the resonance operation direction. That is, $\alpha°$ illustrated in FIG. 12 is an angle at which the laser light beams LR1 to LR3 reflected by the mirror 700 move in a direction substantially orthogonal to the resonance operation direction (for example, in the horizontal direction) of the mirror 700 while reciprocating halfway in the resonance operation direction. The reference sign f illustrated in FIG. 12 is a focal length of the lens 500 that substantially collimates the laser light beams LR1 to LR3 emitted from the output ports W1 to W3. The reference sign d illustrated in FIG. 12 represents a distance from the center of the output port W1 to the center of the output port W2 and a distance from the center of the output port W2 to the center of the output port W3. m represents an integer of 0 or more.

A case where a plurality of laser light beams (light beams) overlaps on the screen (for example, on the retina) is expressed by following Formula (2).
[Expression 8]

$$d = f\tan[\alpha(m+1)] \quad (2)$$

In Formula (2), N is the number of output ports included in the optical waveguide 1, and the number of output ports in FIG. 12 is three (W1 to W3). $\alpha°$ illustrated in FIG. 12 is an angle at which laser light beams LR1 to LR3 reflected by the mirror 700 move in a direction substantially orthogonal to a resonance operation direction (for example, in the horizontal direction) of the mirror 700 while reciprocating halfway in the resonance operation direction. That is, $\alpha°$ illustrated in FIG. 12 is an angle at which the laser light beams LR1 to LR3 reflected by the mirror 700 move in a direction substantially orthogonal to the resonance operation direction (for example, in the horizontal direction) of the mirror 700 while reciprocating halfway in the resonance operation direction. The reference sign f illustrated in FIG. 12 is a focal length of the lens 500 that substantially collimates the laser light beams LR1 to LR3 emitted from the output ports W1 to W3. The reference sign d illustrated in FIG. 12 represents a distance from the center of the output port W1 to the center of the output port W2 and a distance from the center of the output port W2 to the center of the output port W3. m represents an integer of 0 or more.

The optical waveguide 1-17*a* and the optical waveguide 1-17*b* will be described with reference to FIG. 17. The optical waveguide 1-17*a* illustrated in FIG. 17(*a*) is formed by embedding three cores 11*a* in substantially the same layer (substantially the same layer) in a cladding 11-1*a* formed on a substrate 11-2*a*. Then, three laser light beams enter into the optical waveguide 1-17*a* (three cores 11*a* embedded in the cladding 11-1*a*) and are guided onto a two-dimensional plane.

The optical waveguide 1-17*b* illustrated in FIG. 17(*b*) has three cores 11*b* formed on a cladding 11-1*b* which are formed on a substrate 11-2*b*. Then, three laser light beams enter onto the optical waveguide 1-17*b* (three cores 11*b* formed on the cladding 11-1*b*) and are guided onto a two-dimensional plane.

The above description for the video projection device according to the first embodiment (Example 1 of the video projection device) of the present technology can be applied to video projection devices according to the second to fifth embodiments of the present technology described later as long as there is no particular technical inconsistency.

3. Second Embodiment (Example 2 of Video Projection Device)

A video projection device according to the second embodiment (Example 2 of the video projection device) of the present technology includes at least: multiple monolithic semiconductor laser arrays, each of which includes one or more light emitting units that emit a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which the laser light beams respectively emitted from the one or more light emitting units of the multiple monolithic semiconductor laser arrays differ in wavelength, and the one or more light emitting units of the multiple monolithic semiconductor laser arrays are respectively optically coupled to different input ports among multiple input ports included in the optical waveguide.

The optical waveguide is, for example, a planar waveguide that guides the laser light beam onto a two-dimensional plane. In the monolithic semiconductor laser array, the multiple light emitting units are formed on the same substrate by semiconductor lithography, for example.

Figure 2:
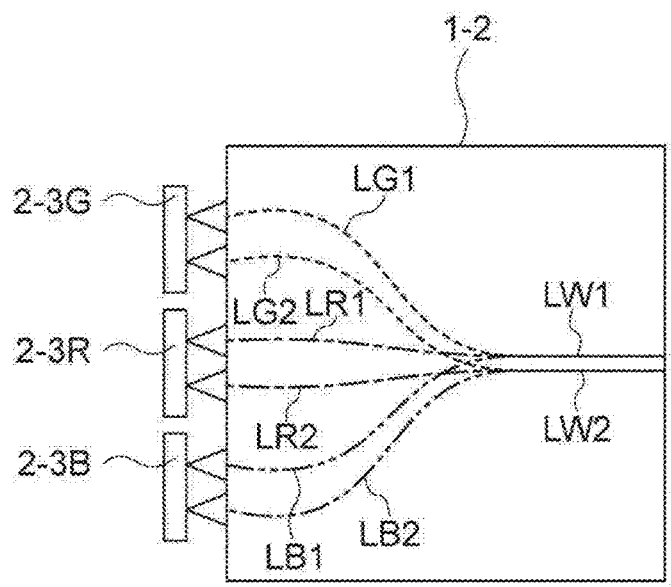
FIG. 2 is a diagram illustrating a configuration example of a monolithic semiconductor laser array and an optical waveguide included in a video projection device according to a second embodiment to which the present technology is applied.
Figure 3:
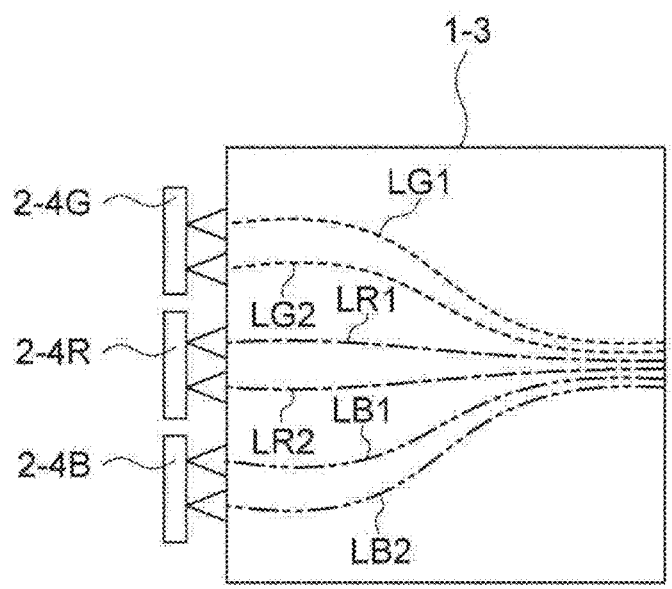
FIG. 3 is a diagram illustrating a configuration example of a monolithic semiconductor laser array and an optical waveguide included in the video projection device according to the second embodiment to which the present technology is applied.

The video projection device according to the second embodiment of the present technology will be described with reference to FIGS. 2 and 3. FIG. 2 is a top view illustrating monolithic semiconductor laser arrays 2-3G, 2-3R, and 2-3B and an optical waveguide 1-2 included in the video projection device according to the second embodiment of the present technology, and FIG. 3 is a top view illustrating monolithic semiconductor laser arrays 2-4G, 2-4R, and 2-4B and an optical waveguide 1-3 included in the video projection device according to the second embodiment of the present technology.

First, description will be given with reference to FIG. 2. FIG. 2 describes a case where a combined wave obtained by multiplexing monolithic semiconductor laser arrays having different wavelengths is converted into multiple beams and emitted.

As illustrated in FIG. 2, white laser light (multiple beams) can be output by multiplexing red laser light, blue laser light, and green laser light, and a color video can be projected by independently modulating light of each wavelength. Specifically, regarding two green laser light beams (multiple beams) LG1 and LG2 emitted from the monolithic semiconductor laser array 2-3G and guided to the optical waveguide 1-2, two red laser light beams (multiple beams) LR1 and LR2 emitted from the monolithic semiconductor laser array 2-3R and guided to the optical waveguide 1-2, and two blue laser light beams (multiple beams) LB1 and LB2 emitted from the monolithic semiconductor laser array 2-3B and guided to the optical waveguide 1-2, the green laser light beam LG1, the red laser light beam LR1, and the blue laser light beam LB1 are combined to output a white laser light beam (multiple beams) LW1 on or in the optical waveguide 1-2, and the green laser light beam LG2, the red laser light beam LR2, and the blue laser light beam LB2 are combined to output a white laser light beam (multiple beams) LW2 on or in the optical waveguide 1-2.

The video projection device according to the second embodiment achieves multibeam control and multi-wavelength multiplexing on the optical waveguide at a time, so that the video projection device can be downsized. In addition, although in FIG. 2, three wavelengths are multiplexed using two multiple beams, the number of multiple beams and the number of wavelengths to be multiplexed are not limited thereto.

Next, description will be given with reference to FIG. 3. As illustrated in FIG. 3, it is also conceivable that multiple beams having different wavelengths are not multiplexed, but emitted with the distance between light emission points being decreased.

Specifically, as illustrated in FIG. 3, two green laser light beams (multiple beams) LG1 and LG2 emitted from the monolithic semiconductor laser array 2-4G and guided to the optical waveguide 1-3, two red laser light beams (multiple beams) LR1 and LR2 emitted from the monolithic semiconductor laser array 2-4R and guided to the optical waveguide 1-3, and two blue laser light beams (multiple beams) LB1 and LB2 emitted from the monolithic semiconductor laser array 2-4B and guided to the optical waveguide 1-3 are emitted with the distance (interval) between the light emission points being decreased without being multiplexed on or in the optical waveguide 1-3.

In a case where the laser light beams are projected as an image, a delay is adjusted by a control board to obtain a video having no deviation upon modulating light of each wavelength with a video signal and outputting the modulated light. In the embodiment, the effective area of the video is slightly narrowed by the delay correction, but there is no loss generated when the different wavelengths are multiplexed, so that the light utilization efficiency is increased.

The above description for the video projection device according to the second embodiment (Example 2 of the video projection device) of the present technology can be applied to the above-mentioned video projection device according to the first embodiment of the present technology and video projection devices according to the third to fifth embodiments of the present technology described later as long as there is no particular technical inconsistency.

4. Third Embodiment (Example 3 of Video Projection Device)

A video projection device according to the third embodiment (Example 3 of the video projection device) of the present technology includes at least: multiple monolithic semiconductor laser arrays, each of which includes at least one light emitting unit that emits a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which at least one monolithic semiconductor laser array among the multiple monolithic semiconductor laser arrays includes multiple light emitting units, the laser light beams respectively emitted from the multiple light emitting units included in the at least one monolithic semiconductor laser array differ in wavelength, and the multiple light emitting units of the at least one monolithic semiconductor laser array are respectively optically coupled to different input ports among a plurality of input ports included in the optical waveguide.

The optical waveguide is, for example, a planar waveguide that guides the laser light beam onto a two-dimensional plane. In the monolithic semiconductor laser array, the multiple light emitting units are formed on the same substrate by semiconductor lithography, for example.

Figure 4:
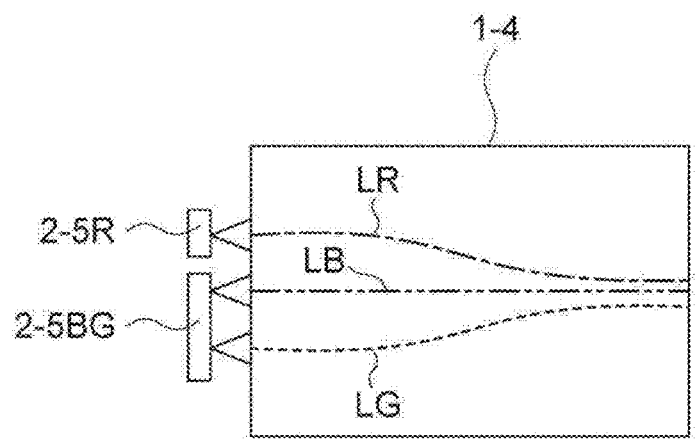
FIG. 4 is a diagram illustrating a configuration example of a monolithic semiconductor laser array and an optical waveguide included in a video projection device according to a third embodiment to which the present technology is applied.

The video projection device according to the third embodiment of the present technology will be described with reference to FIGS. 4 and 5. FIG. 4 is a top view illustrating monolithic semiconductor laser arrays 2-5R and 2-5BG and an optical waveguide 1-4 included in the video projection device according to the third embodiment of the present technology, and FIG. 5 is a top view illustrating monolithic semiconductor laser arrays 2-6R and 2-6BG and an optical waveguide 1-5 included in the video projection device according to the third embodiment of the present technology.

Figure 5:
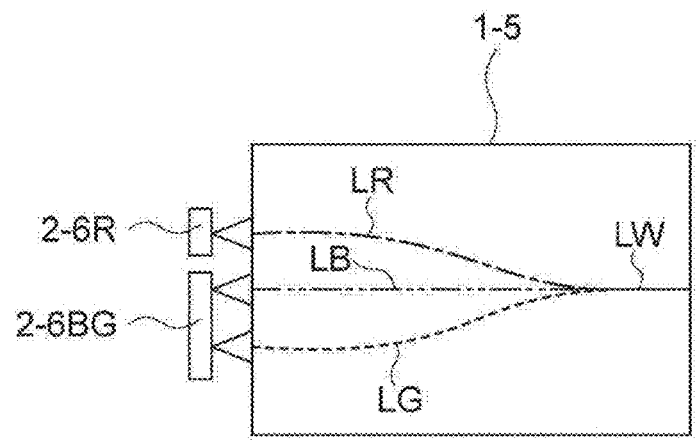
FIG. 5 is a diagram illustrating a configuration example of a monolithic semiconductor laser array and an optical waveguide included in the video projection device according to the third embodiment to which the present technology is applied.

In the above, the light sources (light emitting units) formed by the monolithic laser array have the same wavelength, but as illustrated in FIGS. 4 and 5, light sources (light emitting units) having different wavelengths may be monolithically fabricated. First, description will be given with reference to FIG. 4. As illustrated in FIG. 4, laser light beams may be emitted in the optical waveguide with the distance between light emission points being decreased, and a delay may be adjusted on a control board side.

Specifically, as illustrated in FIG. 4, a single red laser light beam LR emitted from the monolithic semiconductor laser array 2-5R and guided to the optical waveguide 1-4, a single blue laser light beam LB and a single green laser light beam LG (two laser light beams in total) emitted from the monolithic semiconductor laser array 2-5BG and guided to the optical waveguide 1-4 are emitted with the distance (interval) between the light emission points being decreased without being multiplexed on or in the optical waveguide 1-4.

Next, description will be given with reference to FIG. 5. As illustrated in FIG. 5, the laser light beams may be multiplexed on or in the optical waveguide 1-5.

Specifically, as illustrated in FIG. 5, a single red laser light beam LR emitted from the monolithic semiconductor laser array 2-6R and guided to the optical waveguide 1-5, a single blue laser light beam LB and a single green laser light beam LG (two laser light beams in total) emitted from the monolithic semiconductor laser array 2-6BG and guided to the optical waveguide 1-5 are multiplexed on or in the optical waveguide 1-5 and emitted as a white laser light beam (multiple beams) LW.

The above description for the video projection device according to the third embodiment (Example 3 of the video projection device) of the present technology can be applied to the above-mentioned video projection devices according to the first and second embodiments of the present technology and video projection devices according to the fourth and fifth embodiments of the present technology described later as long as there is no particular technical inconsistency.

5. Fourth Embodiment (Example 4 of Video Projection Device)

A video projection device according to a fourth embodiment (Example 4 of the video projection device) of the present technology is obtained by applying an edge-emitting monolithic semiconductor laser array to the video projection devices according to the first to third embodiments of the present technology.

Specifically, the video projection device according to a first aspect of the fourth embodiment of the present technology includes at least: an edge-emitting monolithic semiconductor laser array including multiple light emitting units, each of which emits a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which the multiple light emitting units are respectively optically coupled to different input ports among multiple input ports included in the optical waveguide.

Moreover, a video projection device according to a second aspect of the fourth embodiment of the present technology includes at least: multiple edge-emitting monolithic semiconductor laser arrays, each of which includes one or more light emitting units that emit a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which the laser light beams respectively emitted from the one or more light emitting units of the multiple edge-emitting monolithic semiconductor laser arrays differ in wavelength, and the one or more light emitting units of the multiple edge-emitting monolithic semiconductor laser arrays are respectively optically coupled to different input ports among multiple input ports included in the optical waveguide.

Furthermore, a video projection device according to a third aspect of the fourth embodiment of the present technology includes at least: multiple edge-emitting monolithic semiconductor laser arrays, each of which includes at least one light emitting unit that emits a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which at least one edge-emitting monolithic semiconductor laser array among the multiple edge-emitting monolithic semiconductor laser arrays includes multiple light emitting units, the laser light beams respectively emitted from the multiple light emitting units included in the at least one edge-emitting monolithic semiconductor laser array differ in wavelength, and the multiple light emitting units of the at least one edge-emitting monolithic semiconductor laser array are respectively optically coupled to different input ports among a plurality of input ports included in the optical waveguide.

The optical waveguide is, for example, a planar waveguide that guides the laser light beam onto a two-dimensional plane. In the edge-emitting monolithic semiconductor laser array, the multiple light emitting units are formed on the same substrate by semiconductor lithography, for example.

Figure 6:
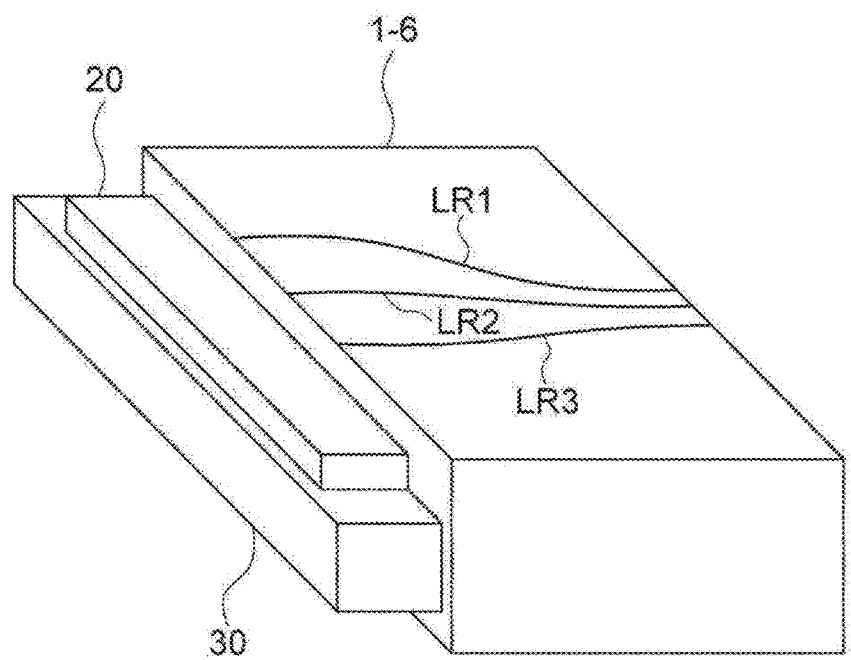
FIG. 6 is a diagram illustrating a configuration example of a monolithic semiconductor laser array and an optical waveguide included in a video projection device according to a fourth embodiment to which the present technology is applied.
Figure 7:
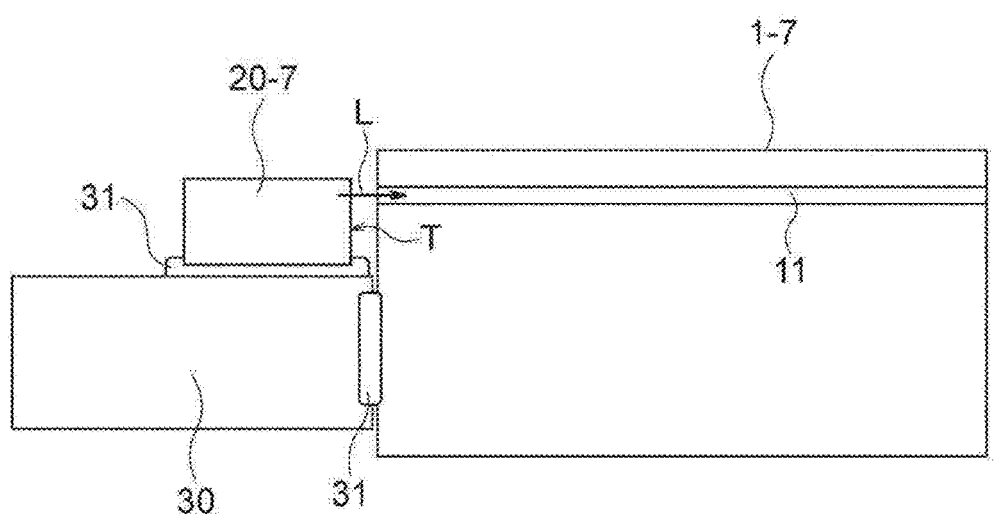
FIG. 7 is a diagram illustrating a configuration example of a monolithic semiconductor laser array and an optical waveguide included in the video projection device according to the fourth embodiment to which the present technology is applied.
Figure 8:
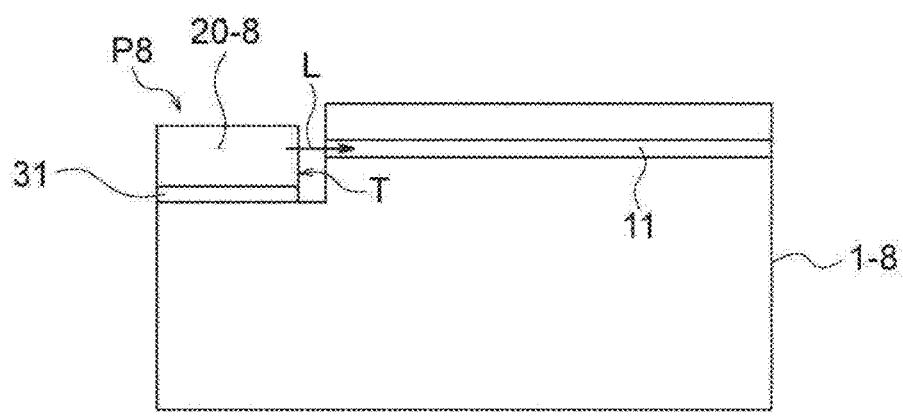
FIG. 8 is a diagram illustrating a configuration example of a monolithic semiconductor laser array and an optical waveguide included in the video projection device according to the fourth embodiment to which the present technology is applied.

The video projection device according to the fourth embodiment of the present technology will be described with reference to FIGS. 6 to 8, 13, and 15. FIG. 6 is a perspective view illustrating an edge-emitting monolithic semiconductor laser array 20 and an optical waveguide 1-6 included in the video projection device according to the fourth embodiment of the present technology. FIG. 7 is a sectional view illustrating an edge-emitting monolithic semiconductor laser array 20-7 and an optical waveguide 1-7 included in the video projection device according to the fourth embodiment of the present technology, and FIG. 8 is a sectional view illustrating an edge-emitting monolithic semiconductor laser array 20-8 and an optical waveguide 1-8 included in the video projection device according to the fourth embodiment of the present technology.

Figure 13:
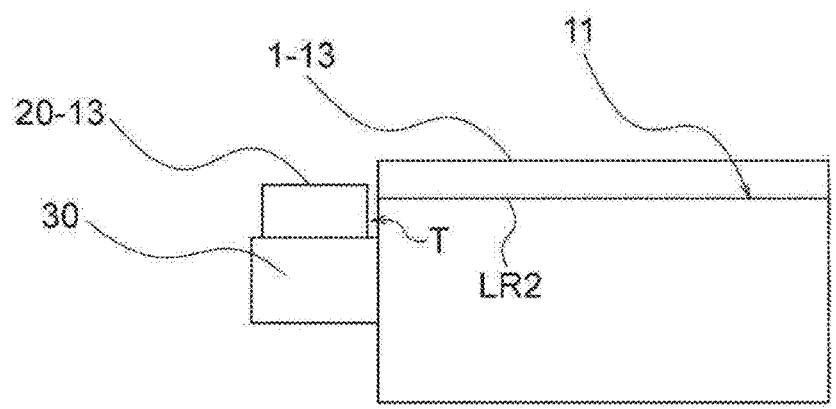
FIG. 13 is a diagram illustrating a configuration example of a monolithic semiconductor laser array and an optical waveguide included in the video projection device according to the fourth embodiment to which the present technology is applied.
Figure 13:
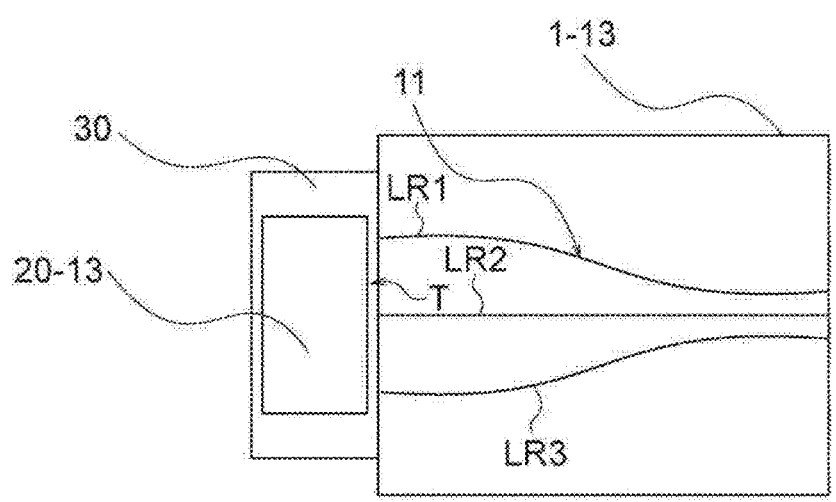

FIG. 13(a) in FIG. 13 is a sectional view illustrating an edge-emitting monolithic semiconductor laser array 20-13 and an optical waveguide 1-13 included in the video projection device according to the fourth embodiment of the present technology, and FIG. 13(b) is a top view illustrating the edge-emitting monolithic semiconductor laser array 20-13 and the optical waveguide 1-13 included in the video projection device according to the fourth embodiment of the present technology.

Figure 15:
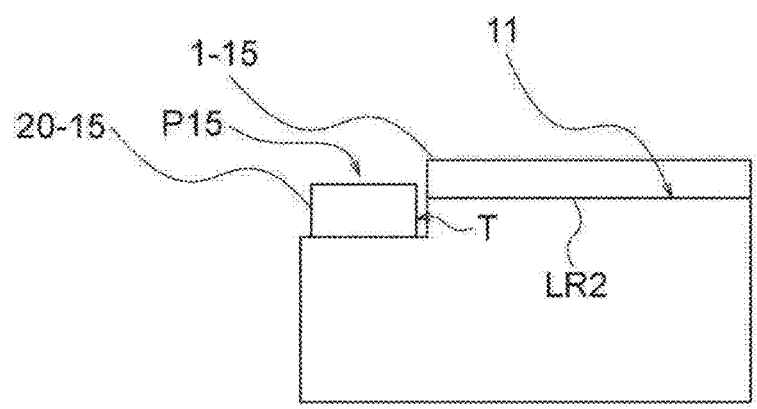
FIG. 15 is a diagram illustrating a configuration example of a monolithic semiconductor laser array and an optical waveguide included in the video projection device according to the fourth embodiment to which the present technology is applied.
Figure 15:
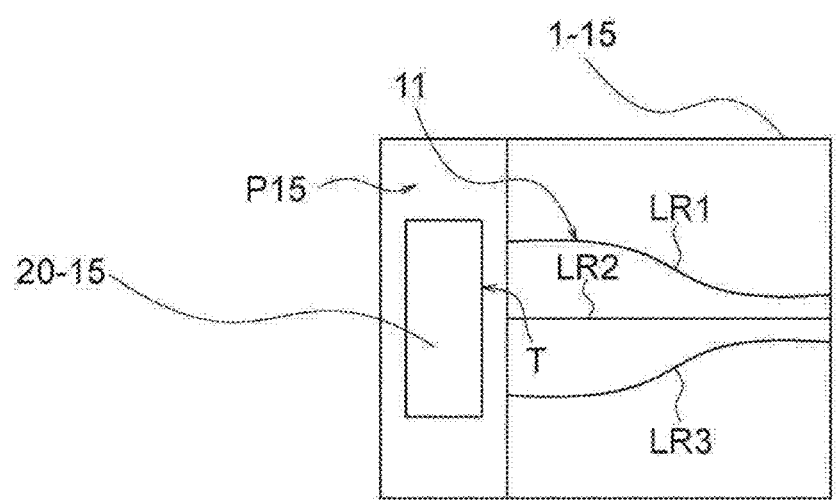

FIG. 15(a) in FIG. 15 is a sectional view illustrating an edge-emitting monolithic semiconductor laser array 20-15 and an optical waveguide 1-15 included in the video projection device according to the fourth embodiment of the present technology, and FIG. 15(b) is a top view illustrating the edge-emitting monolithic semiconductor laser array 20-15 and the optical waveguide 1-15 included in the video projection device according to the fourth embodiment of the present technology.

First, description will be given with reference to FIG. 6. FIG. 6 is a perspective view illustrating the optical waveguide 1-6 and the edge-emitting monolithic semiconductor laser array 20 which are joined via a base 30. A laser light beam LR1, a laser light beam LR2, and a laser light beam LR3 emitted from three light emitting units included in the edge-emitting monolithic semiconductor laser array 20 enter the optical waveguide 1-6.

FIG. 7 is a cross-sectional view illustrating the configuration illustrated in FIG. 6. As illustrated in FIG. 7, the edge-emitting monolithic semiconductor laser array 20-7 can be mounted with the distance between light emitting units (light emission points) formed on an end face T of the edge-emitting monolithic semiconductor laser array 20-7 and an input port of the optical waveguide 1-7 being controlled due to the base 30. A laser light beam L emitted from a light emitting unit (light emission point) of the edge-emitting monolithic semiconductor laser array 20-7 enters a core 11 of the optical waveguide 1-7. Then, the base 30 and the optical waveguide 1-7 are joined via an adhesive part 31, and the base 30 and the edge-emitting monolithic semiconductor laser array 20-7 are joined via the adhesive part 31. A solder or silver paste having high reliability is preferably used for bonding by the adhesive part 31.

FIG. 8 illustrates another example of mounting an edge-emitting monolithic laser array. As illustrated in FIG. 8, the optical waveguide 1-8 is formed with a recess P8 (notch region having a cliff part) in which the edge-emitting monolithic laser array 20-8 is mounted.

As illustrated in FIG. 8, the edge-emitting monolithic semiconductor laser array 20-8 can be mounted with the distance between a light emitting unit (light emission point) formed on an end face T of the edge-emitting monolithic semiconductor laser array 20-8 and an input port of the optical waveguide 1-8 being controlled. A laser light beam L emitted from the light emitting unit (light emission point) of the edge-emitting monolithic semiconductor laser array 20-8 enters a core 11 of the optical waveguide 1-8. Then, the edge-emitting monolithic semiconductor laser array 20-7 and the optical waveguide 1-8 are joined via an adhesive part 31. A solder or silver paste having high reliability is preferably used for bonding by the adhesive part 31. Since there is only one bonding portion (only adhesive part between the edge-emitting monolithic semiconductor laser array 20-7 and the optical waveguide 1-8 by the adhesive part 31), reliability is enhanced.

Description will be given with reference to FIG. 13. As illustrated in FIG. 13(a), the edge-emitting monolithic semiconductor laser array 20-13 can be mounted with the distance between a light emitting unit (light emission point) formed on an end face T of the edge-emitting monolithic semiconductor laser array 20-13 and an input port of the optical waveguide 1-13 being controlled due to the base 30. A laser light beam LR2 emitted from the light emitting unit (light emission point) of the edge-emitting monolithic semiconductor laser array 20-13 enters a core 11 of the optical waveguide 1-13.

FIG. 13(b) is a top view corresponding to the sectional view illustrated in FIG. 13(a). As illustrated in FIG. 13(b), a base 30 having an area larger than the area of the edge-emitting monolithic semiconductor laser array 20-13 is disposed, so that the edge-emitting monolithic semiconductor laser array 20-13 is stably mounted on the base 30. Laser light beams LR1, LR2, and LR3 emitted from three light emitting units (light emission points) formed on the end face T of the edge-emitting monolithic semiconductor laser array 20-13 enter the core 11 of the optical waveguide 1-13.

Finally, description will be given with reference to FIG. 15. As illustrated in FIG. 15(a), the optical waveguide 1-15 is formed with a recess P15 (notch region having a cliff part) in which the edge-emitting monolithic laser array 20-15 is mounted.

As illustrated in FIG. 15, the edge-emitting monolithic semiconductor laser array 20-15 can be mounted with the distance between a light emitting unit (light emission point) formed on an end face T of the edge-emitting monolithic semiconductor laser array 20-15 and an input port of the optical waveguide 1-15 being controlled. A laser light beam LR2 emitted from the light emitting unit (light emission point) of the edge-emitting monolithic semiconductor laser array 20-15 enters a core 11 of the optical waveguide 1-15.

FIG. 15(b) is a top view corresponding to the sectional view illustrated in FIG. 15(a). As illustrated in FIG. 15(b), a base 30 having an area larger than the area of the edge-emitting monolithic semiconductor laser array 20-15 is disposed, so that the edge-emitting monolithic semiconductor laser array 20-15 is stably mounted on the base 30. Laser light beams LR1, LR2, and LR3 emitted from three light emitting units (light emission points) formed on the end face T of the edge-emitting monolithic semiconductor laser array 20-15 enter the core 11 of the optical waveguide 1-15.

The above description for the video projection device according to the fourth embodiment (Example 4 of the video projection device) of the present technology can be applied to the above-mentioned video projection devices according to the first to third embodiments of the present technology and the video projection device according to the fifth embodiment of the present technology described later as long as there is no particular technical inconsistency.

6. Fifth Embodiment (Example 5 of Video Projection Device)

A video projection device according to the fifth embodiment (Example 5 of the video projection device) of the present technology is obtained by applying a surface-emitting monolithic semiconductor laser array to the video projection devices according to the first to third embodiments of the present technology.

Specifically, the video projection device according to a first aspect of the fifth embodiment of the present technology includes at least: a surface-emitting monolithic semiconductor laser array including multiple light emitting units, each of which emits a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which the multiple light emitting units are respectively optically coupled to different input ports among multiple input ports included in the optical waveguide.

In addition, a video projection device according to a second aspect of the fifth embodiment of the present technology includes at least: multiple surface-emitting monolithic semiconductor laser arrays, each of which includes one or more light emitting units that emit a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which the laser light beams respectively emitted from the one or more light emitting units of the multiple surface-emitting monolithic semiconductor laser arrays differ in wavelength, and the one or more light emitting units of the multiple surface-emitting monolithic semiconductor laser arrays are respectively optically coupled to different input ports among multiple input ports included in the optical waveguide.

Furthermore, a video projection device according to a third aspect of the fifth embodiment of the present technology includes at least: multiple surface-emitting monolithic semiconductor laser arrays, each of which includes at least one light emitting unit that emits a laser light beam; an optical waveguide that guides the laser light beam in a predetermined direction; a mirror that scans the laser light beam in two axes; and a diffractive element that diffracts the laser light beam in a specific direction in front of an eye and projects the laser light beam on a retina, in which at least one surface-emitting monolithic semiconductor laser array among the multiple surface-emitting monolithic semiconductor laser arrays includes multiple light emitting units, the laser light beams respectively emitted from the multiple light emitting units included in the at least one surface-emitting monolithic semiconductor laser array differ in wavelength, and the multiple light emitting units of the at least one surface-emitting monolithic semiconductor laser array are respectively optically coupled to different input ports among a plurality of input ports included in the optical waveguide.

The optical waveguide is, for example, a planar waveguide that guides the laser light beam onto a two-dimensional plane. In the edge-emitting monolithic semiconductor laser array, the multiple light emitting units are formed on the same substrate by semiconductor lithography, for example.

Figure 9:
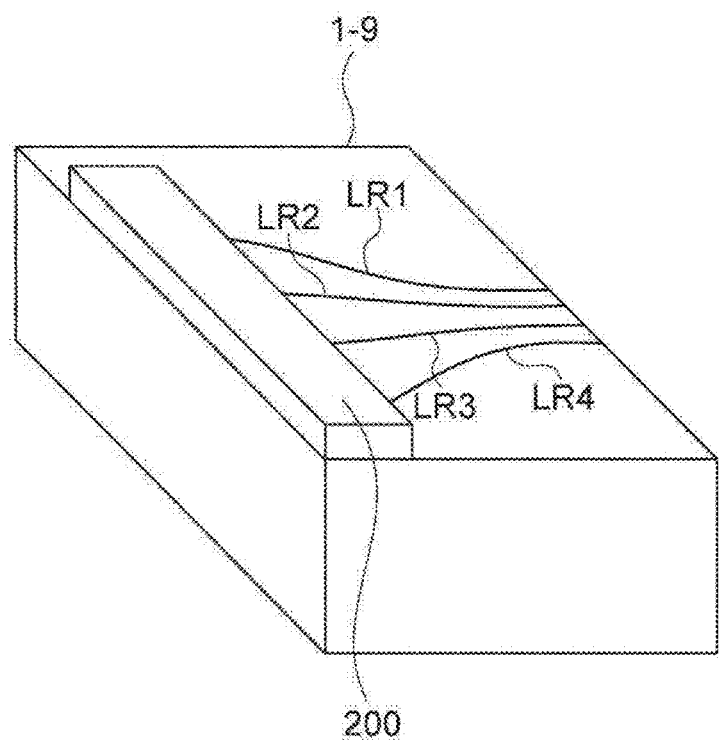
FIG. 9 is a diagram illustrating a configuration example of a monolithic semiconductor laser array and an optical waveguide included in a video projection device according to a fifth embodiment to which the present technology is applied.
Figure 10:
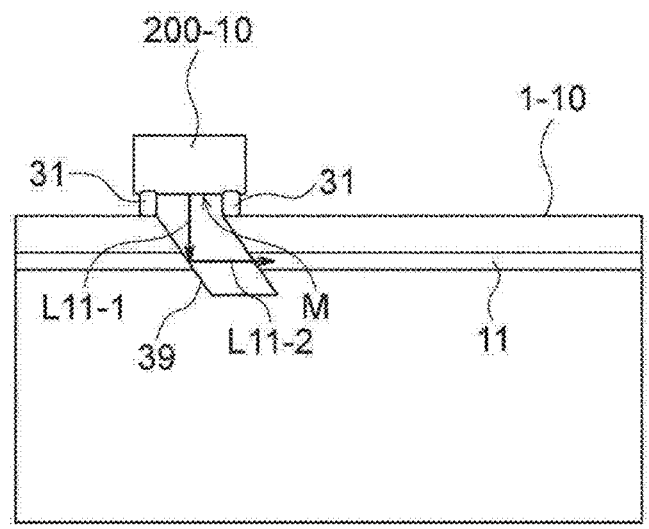
FIG. 10 is a diagram illustrating a configuration example of a monolithic semiconductor laser array and an optical waveguide included in the video projection device according to the fifth embodiment to which the present technology is applied.
Figure 11:
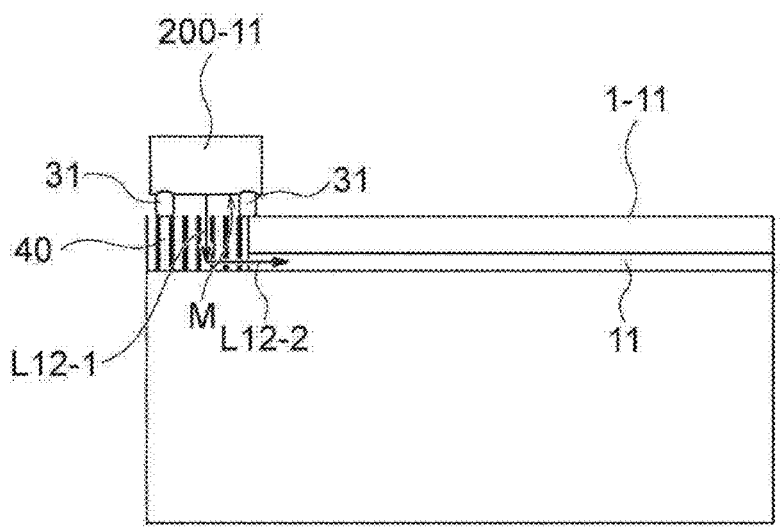
FIG. 11 is a diagram illustrating a configuration example of a monolithic semiconductor laser array and an optical waveguide included in the video projection device according to the fifth embodiment to which the present technology is applied.

The video projection device according to the fifth embodiment of the present technology will be described with reference to FIGS. 9 to 11, 14, and 16. FIG. 9 is a perspective view illustrating a surface-emitting monolithic semiconductor laser array 200 and an optical waveguide 1-9 included in the video projection device according to the fifth embodiment of the present technology. FIG. 10 is a sectional view illustrating a surface-emitting monolithic semiconductor laser array 200-10 and an optical waveguide 1-10 included in the video projection device according to the fifth embodiment of the present technology, and FIG. 11 is a sectional view illustrating a surface-emitting monolithic semiconductor laser array 200-11 and an optical waveguide 1-11 included in the video projection device according to the fifth embodiment of the present technology.

Figure 14:
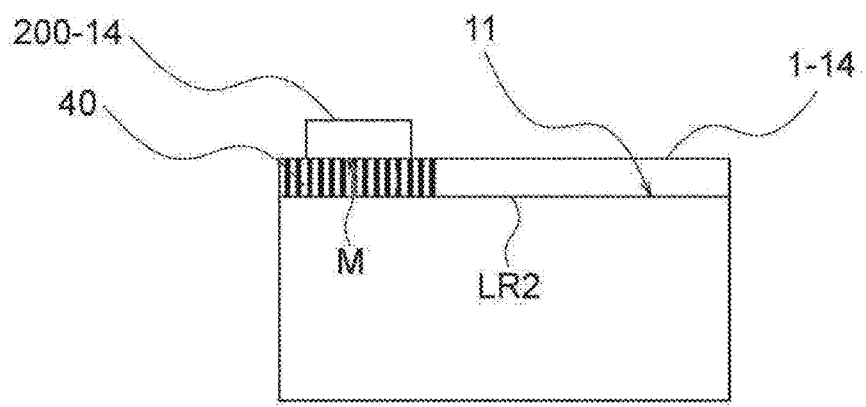
FIG. 14 is a diagram illustrating a configuration example of a monolithic semiconductor laser array and an optical waveguide included in the video projection device according to the fifth embodiment to which the present technology is applied.
Figure 14:
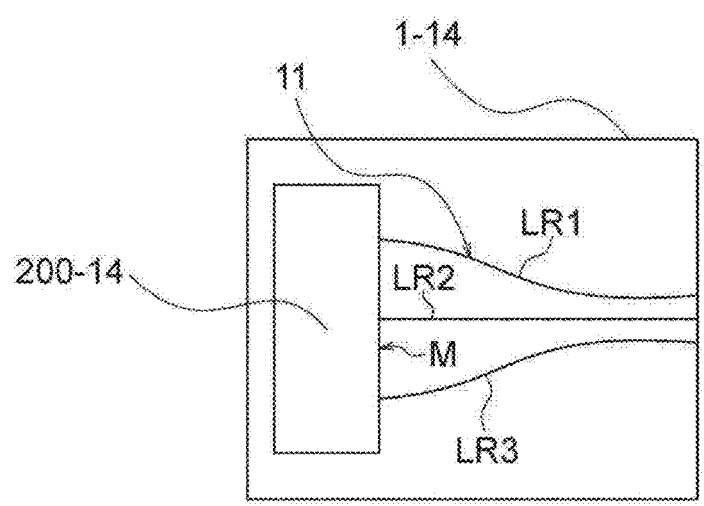

FIG. 14(a) in FIG. 14 is a sectional view illustrating a surface-emitting monolithic semiconductor laser array 200-14 and an optical waveguide 1-14 included in the video projection device according to the fifth embodiment of the present technology, and FIG. 14(b) is a top view illustrating the surface-emitting monolithic semiconductor laser array 200-14 and the optical waveguide 1-14 included in the video projection device according to the fifth embodiment of the present technology.

Figure 16:
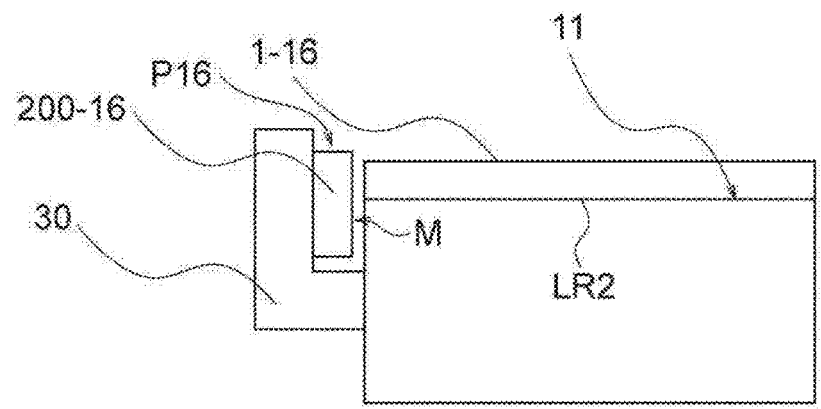
FIG. 16 is a diagram illustrating a configuration example of a monolithic semiconductor laser array and an optical waveguide included in the video projection device according to the fifth embodiment to which the present technology is applied.
Figure 16:
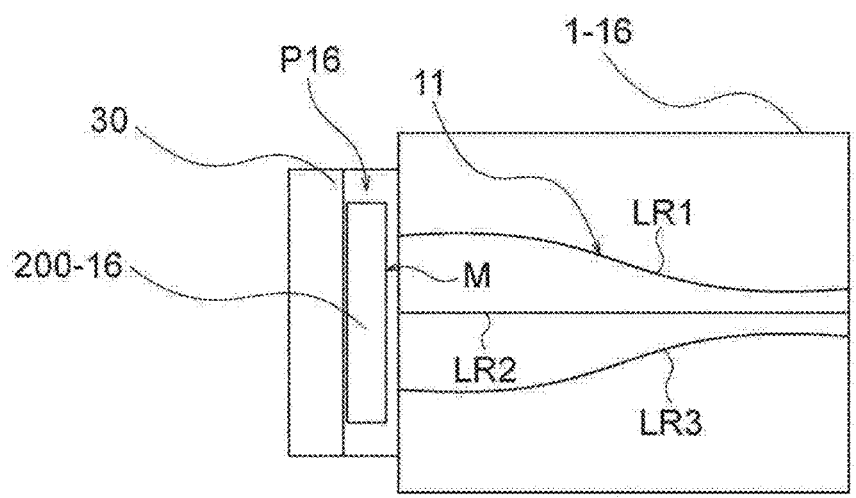

FIG. 16(a) in FIG. 16 is a sectional view illustrating a surface-emitting monolithic semiconductor laser array 200-16 and an optical waveguide 1-16 included in the video projection device according to the fifth embodiment of the present technology, and FIG. 16(b) is a top view illustrating the surface-emitting monolithic semiconductor laser array 200-16 and the optical waveguide 1-16 included in the video projection device according to the fifth embodiment of the present technology.

First, description will be given with reference to FIG. 9. FIG. 9 is a perspective view illustrating an example of mounting the optical waveguide 1-9 and the surface-emitting monolithic semiconductor laser array 200. As illustrated in FIG. 9, the surface-emitting monolithic semiconductor laser array 200 is mounted on the optical waveguide 1-9. Laser light beam LR1, laser light beam LR2, laser light beam LR3, and laser light beam LR4 emitted from three light emitting units included in the surface-emitting monolithic semiconductor laser array 200 enter the optical waveguide 1-9.

FIG. 10 illustrates one example of the configuration illustrated in FIG. 9 in cross section. As illustrated in FIG. 10, the surface-emitting monolithic semiconductor laser array 200-10 and the optical waveguide 1-10 are bonded to each other by surface attachment. That is, a lower surface M of the surface-emitting monolithic semiconductor laser array 200-10 and the optical waveguide 1-10 are joined via an adhesive part 31. A solder or silver paste having high reliability is preferably used for bonding by the adhesive part 31. In FIG. 10, a laser light beam L11-1 (laser light beam L11-2 reflected by a mirror 30) emitted from a light emitting unit formed on the lower surface M of the surface-emitting monolithic semiconductor laser array 200-10 is optically coupled to the optical waveguide 1-10 (core 11) via the mirror 39.

Description will be given with reference to FIG. 11. FIG. 11 illustrates one example of the configuration illustrated in FIG. 9 in cross section. As illustrated in FIG. 11, the surface-emitting monolithic semiconductor laser array 200-11 and the optical waveguide 1-11 are bonded to each other by surface attachment. That is, a lower surface M of the surface-emitting monolithic semiconductor laser array 200-11 and the optical waveguide 1-11 are joined via the adhesive part 31. A solder or silver paste having high reliability is preferably used for bonding by the adhesive part 31. In FIG. 11, a laser light beam L12-1 (laser light beam L12-2 diffracted by a diffractive element 40) emitted from a light emitting unit formed on the lower surface M of the surface-emitting monolithic semiconductor laser array 200-11 is optically coupled to the optical waveguide 1-11 (core 11) via the diffractive element 40.

Description will be given with reference to FIG. 14. As illustrated in FIG. 14(a), the surface-emitting monolithic semiconductor laser array 200-11 (lower surface M of the surface-emitting monolithic semiconductor laser array 200-11) and the optical waveguide 1-14 (diffractive element 40) are bonded to each other by surface attachment. In FIG. 14, a laser light beam LR-2 emitted from a light emitting unit formed on the lower surface M of the surface-emitting monolithic semiconductor laser array 200-14 is diffracted by the diffractive element 40 and optically coupled to the optical waveguide 1-14 (core 11) via the diffractive element 40.

FIG. 14(b) is a top view corresponding to the sectional view illustrated in FIG. 14(a). As illustrated in FIG. 14(b), laser light beams LR1, LR2, and LR3 emitted from three light emitting units (light emission points) formed on the surface (lower surface) M of the surface-emitting monolithic semiconductor laser array 200-14 are diffracted by the diffractive element (not illustrated in FIG. 14(b)) and enter (are optically coupled to) the core 11 of the optical waveguide 1-13.

Finally, description will be given with reference to FIG. 16. As illustrated in FIG. 16(a), the surface-emitting monolithic semiconductor laser array 200-16 can be mounted with the distance between a light emitting unit (light emission point) formed on a surface M of the surface-emitting monolithic semiconductor laser array 200-16 and an input port of the optical waveguide 1-16 being controlled due to the base 30. The base 30 in FIG. 16 includes a vertical portion (extending in the vertical direction in FIG. 16) and a horizontal portion (extending in the horizontal direction in FIG. 16). The surface-emitting monolithic semiconductor laser array 200-16 is joined to the vertical portion of the base 30, and the surface-emitting monolithic semiconductor laser array 200-16 is directly joined (via air) to the optical waveguide. In addition, the horizontal portion of the base 30 is joined to the optical waveguide 1-16. That is, a recess P16 is formed by the base 30 and the optical waveguide 1-16, and the surface-emitting monolithic semiconductor laser array 200-16 joined to the base 30 is placed in the recess P16. In addition, a laser light beam LR2 emitted from the light emitting unit (light emission point) formed on the surface M of the surface-emitting monolithic semiconductor laser array 200-16 enters the core 11 of the optical waveguide 1-16.

FIG. 16(b) is a top view corresponding to the sectional view illustrated in FIG. 16(a). As illustrated in FIG. 16(b), a base 30 having an area (area obtained by adding the area of the vertical portion and the area of the recess) larger than the area of the surface-emitting monolithic semiconductor laser array 200-16 is disposed, so that the surface-emitting monolithic semiconductor laser array 200-16 is stably mounted in the recess P16 of the base 30. Laser light beams LR1, LR2, and LR3 emitted from three light emitting units (light emission points) formed on the surface M of the surface-emitting monolithic semiconductor laser array 200-16 enter the core 11 of the optical waveguide 1-16.

The above description for the video projection device according to the fifth embodiment (Example 5 of the video projection device) of the present technology can be applied to the video projection devices according to the first to fourth embodiments of the present technology as long as there is no particular technical inconsistency.

It should be noted that embodiments of the present technology are not limited to the abovementioned respective embodiments, and various modifications are possible without departing from the gist of the present technology.

In addition, the effects described in the present specification are merely illustrative and not restrictive, and may have additional effects.

In addition, the present technology may have the following configurations.

[1]
A video projection device including at least:
a monolithic semiconductor laser array including multiple light emitting units, each of which emits a laser light beam;
an optical waveguide that guides the laser light beam in a predetermined direction;
a mirror that scans the laser light beam in two axes; and
a diffractive element that diffracts the laser light beam in a specific direction in front of an eye and projects the laser light beam on a retina,
in which the multiple light emitting units are respectively optically coupled to different input ports among
multiple input ports included in the optical waveguide.

[2]
The video projection device according to [1], in which the laser light beams respectively emitted from the multiple light emitting units included in the monolithic semiconductor laser array have substantially same wavelengths.

[3]
A video projection device comprising at least:
multiple monolithic semiconductor laser arrays, each of which includes one or more light emitting units that emit a laser light beam;
an optical waveguide that guides the laser light beam in a predetermined direction;
a mirror that scans the laser light beam in two axes; and
a diffractive element that diffracts the laser light beam in a specific direction in front of an eye and projects the laser light beam on a retina,
in which the laser light beams respectively emitted from the one or more light emitting units of the multiple monolithic semiconductor laser arrays differ in wavelength, and
the one or more light emitting units of the multiple monolithic semiconductor laser arrays are respectively optically coupled to different input ports among multiple input ports included in the optical waveguide.

[4]
The video projection device according to [3], in which the laser light beams that differ in the wavelength are multiplexed in the optical waveguide.

[5]
A video projection device including at least:
multiple monolithic semiconductor laser arrays, each of which includes at least one light emitting unit that emits a laser light beam;
an optical waveguide that guides the laser light beam in a predetermined direction;
a mirror that scans the laser light beam in two axes; and
a diffractive element that diffracts the laser light beam in a specific direction in front of an eye and projects the laser light beam on a retina,
in which at least one monolithic semiconductor laser array among the multiple monolithic semiconductor laser arrays includes multiple light emitting units,
the laser light beams respectively emitted from the multiple light emitting units included in the at least one monolithic semiconductor laser array differ in wavelength, and
the multiple light emitting units of the at least one monolithic semiconductor laser array are respectively optically coupled to different input ports among a plurality of input ports included in the optical waveguide.

[6]
The video projection device according to [5], in which the laser light beams that differ in the wavelength are multiplexed in the optical waveguide.

[7]
The video projection device according to any one of [1] to [6],
in which the monolithic semiconductor laser array and the optical waveguide are joined via a joint member, and
the joint member has heat radiation performance and has a linear expansion coefficient close to a linear expansion coefficient of the monolithic semiconductor laser array and a linear expansion coefficient of the optical waveguide.

[8]
The video projection device according to any one of [1] to [7],
in which at least one interval between output ports of multiple output ports included in the optical waveguide is smaller than at least one interval between input ports of the multiple input ports included in the optical waveguide.

[9]
The video projection device according to any one of [1] to [8],
in which the optical waveguide has at least three output ports, and
intervals between output ports of the at least three output ports are substantially equal to each other.

[10]
The video projection device according to any one of [1] to [9],
in which, when a number of multiple output ports of the optical waveguide is N,
an angle at which the laser light beam reflected by the mirror moves in a direction substantially orthogonal to a resonance operation direction of the mirror while reciprocating halfway in the resonance operation direction is $\alpha°$, a focal length of a lens that substantially collimates the laser light beam emitted from each of the N output ports is f, and a distance between a center of a predetermined output port among the N output ports to a center of an output port adjacent to the predetermined output port is d, the video projection device satisfies following Formula (1)

[Expression 9]

$$d = f \tan[\alpha(m+1/N)] \quad (1)$$

where m is an integer of 0 or more.

The video projection device according to any one of [1] to [9], in which, when a number of multiple output ports of the optical waveguide is N, an angle at which the laser light beam reflected by the mirror moves in a direction substantially orthogonal to a resonance operation direction of the mirror while reciprocating halfway in the resonance operation direction is $\alpha°$, a focal length of a lens that substantially collimates the laser light beam emitted from each of the N output ports is f, and a distance between a center of a predetermined output port among the N output ports to a center of an output port adjacent to the predetermined output port is d, the video projection device satisfies following Formula (2)

[Expression 10]

$$d = f \tan[\alpha(m+1)] \quad (2)$$

where m is an integer of 0 or more.

[12]

The video projection device according to any one of [1] to [11], in which the monolithic semiconductor laser array is of an edge-emitting type.

[13]

The video projection device according to any one of [1] to [11], in which the monolithic semiconductor laser array is of a surface-emitting type.

[14]

The video projection device according to any one of [1] to [13], in which the video projection device is a head mounted display.

[15]

The video projection device according to any one of [1] to [13], in which the video projection device is an eyewear display.

REFERENCE SIGNS LIST

1(1-2, 1-3, 1-4, 1-5, 1-6, 1-7, 1-8, 1-9, 1-10, 1-11, 1-13a, 1-13b, 1-14a, 1-14b, 1-15a, 1-15b, 1-16a, 1-16b, 1-17a, 1-17b) Optical waveguide
2(2-3G, 2-3R, 2-3B, 2-4G, 2-4R, 2-4B, 2-5R, 2-5BG, 2-6R, 2-6BG) Monolithic semiconductor laser array
20(20-7, 20-8, 20-13, 20-15) Monolithic semiconductor laser array (edge-emitting type)
30 Base
200(200-10, 200-11, 200-14, 200-16) Monolithic semiconductor laser array (surface-emitting type)
700 Mirror (MEMS mirror)
800 Diffractive element (hologram element)
1000, 1200 Video projection device
1700 Eyewear display

What is claimed is:

1. A video projection device, comprising:
a monolithic semiconductor laser array including multiple light emitting units, each of which emits a laser light beam;
an optical waveguide that guides the laser light beam in a predetermined direction;
a mirror that scans the laser light beam in two axes; and
a diffractive element that diffracts the laser light beam in a specific direction in front of an eye and projects the laser light beam on a retina,
wherein the multiple light emitting units are respectively optically coupled to different input ports among multiple input ports included in the optical waveguide,
wherein the monolithic semiconductor laser array and the optical waveguide are joined via a joint member, and
wherein the joint member has heat radiation performance and has a linear expansion coefficient close to a linear expansion coefficient of the monolithic semiconductor laser array and a linear expansion coefficient of the optical waveguide.

2. The video projection device according to claim 1, wherein the laser light beams respectively emitted from the multiple light emitting units included in the monolithic semiconductor laser array have substantially same wavelengths.

3. The video projection device according to claim 1, wherein at least one interval between output ports of multiple output ports included in the optical waveguide is smaller than at least one interval between input ports of the multiple input ports included in the optical waveguide.

4. The video projection device according to claim 1, wherein the optical waveguide has at least three output ports, and
intervals between output ports of the at least three output ports are substantially equal to each other.

5. The video projection device according to claim 1, wherein the monolithic semiconductor laser array is of an edge-emitting type.

6. The video projection device according to claim 1, wherein the monolithic semiconductor laser array is of a surface-emitting type.

7. The video projection device according to claim 1, wherein the video projection device is a head mounted display.

8. The video projection device according to claim 1, wherein the video projection device is an eyewear display.

9. The video projection device according to claim 1, wherein the optical waveguide includes a plurality of input ports, and wherein the light emitting units of the monolithic semiconductor laser are optically coupled to different input ports of the optical waveguide.

10. The video projection device according to claim 9, wherein the optical waveguide includes a plurality of output ports.

11. The video projection device according to claim 10, wherein an interval between the output ports is narrower than an interval between the input ports.

12. The video projection device according to claim 1, wherein the optical waveguide is a planar optical waveguide.

13. The video projection device according to claim 1, wherein the optical waveguide includes a plurality of input ports, and wherein the light emitting units of the monolithic semiconductor laser are optically coupled to different input ports of the optical waveguide.

14. The video projection device according to claim 13, wherein the optical waveguide includes a plurality of output ports.

15. A video projection device, comprising:
a monolithic semiconductor laser array including multiple light emitting units, each of which emits a laser light beam;
an optical waveguide that guides the laser light beam in a predetermined direction;
a mirror that scans the laser light beam in two axes; and
a diffractive element that diffracts the laser light beam in a specific direction in front of an eye and projects the laser light beam on a retina,
wherein the multiple light emitting units are respectively optically coupled to different input ports among multiple input ports included in the optical waveguide,
wherein, when a number of multiple output ports of the optical waveguide is N,
an angle at which the laser light beam reflected by the mirror moves in a direction substantially orthogonal to a resonance operation direction of the mirror while reciprocating halfway in the resonance operation direction is $\alpha°$,
a focal length of a lens that substantially collimates the laser light beam emitted from each of the N output ports is f, and
a distance between a center of a predetermined output port among the N output ports to a center of an output port adjacent to the predetermined output port is d, the video projection device satisfies following Formula (1)

[Expression 1]

$$d = f \tan[\alpha(m+1/N)] \qquad (1)$$

where m is an integer of 0 or more.

16. A video projection device, comprising:
a monolithic semiconductor laser array including multiple light emitting units, each of which emits a laser light beam;
an optical waveguide that guides the laser light beam in a predetermined direction;
a mirror that scans the laser light beam in two axes; and
a diffractive element that diffracts the laser light beam in a specific direction in front of an eye and projects the laser light beam on a retina,
wherein the multiple light emitting units are respectively optically coupled to different input ports among multiple input ports included in the optical waveguide,
wherein, when a number of multiple output ports of the optical waveguide is N,
an angle at which the laser light beam reflected by the mirror moves in a direction substantially orthogonal to a resonance operation direction of the mirror while reciprocating halfway in the resonance operation direction is $\alpha°$,
a focal length of a lens that substantially collimates the laser light beam emitted from each of the N output ports is f, and
a distance between a center of a predetermined output port among the N output ports to a center of an output port adjacent to the predetermined output port is d, the video projection device satisfies following Formula (2)

[Expression 2]

$$d = f \tan[\alpha(m+1)] \qquad (2)$$

where m is an integer of 0 or more.

* * * * *